United States Patent

Gabriel et al.

[11] Patent Number: 6,000,893
[45] Date of Patent: Dec. 14, 1999

[54] ANGLED STRIP OF BRADS AND METHOD THEREFOR

[75] Inventors: William L. Gabriel, Barrington; Geronimo E. Lat; Patrick J. Driscoll, both of Prospect Heights; Michael A. Reinhart, Mundelein, all of Ill.

[73] Assignee: Illinois Tool Works Inc., Glenview, Ill.

[21] Appl. No.: 09/169,918

[22] Filed: Oct. 12, 1998

[51] Int. Cl.$^6$ .......................... F16B 15/08; B65D 85/24
[52] U.S. Cl. .......................... 411/442; 411/966; 206/344; 470/34
[58] Field of Search .................. 411/442, 443, 411/444, 966; 206/343, 344; 470/34

[56] References Cited

U.S. PATENT DOCUMENTS

| | | |
|---|---|---|
| 161,280 | 3/1875 | Rogers . |
| 190,975 | 5/1877 | Goddu . |
| 200,839 | 3/1878 | Prusha . |
| 312,691 | 2/1885 | Woodward et al. . |
| 328,103 | 10/1885 | Boyd . |
| 599,933 | 3/1898 | Goddu . |
| 653,266 | 7/1900 | Sherwood . |
| 1,416,971 | 5/1922 | Osborne . |
| 1,605,204 | 11/1926 | Beegle . |
| 1,680,351 | 8/1928 | Warne . |
| 1,733,506 | 10/1929 | Maynard . |
| 3,935,945 | 2/1976 | Smith et al. .................. 411/442 X |
| 4,664,733 | 5/1987 | Masago . |
| 4,815,910 | 3/1989 | Potucek .................. 411/444 |
| 5,380,250 | 1/1995 | Dion .................. 411/443 X |
| 5,615,985 | 4/1997 | Rose et al. . |
| 5,865,585 | 2/1999 | Sutt, Jr. .................. 411/442 |

OTHER PUBLICATIONS

Jim Britton, "Survey of Finish Nailers", 6 pgs.

*Primary Examiner*—Neill Wilson
*Attorney, Agent, or Firm*—Mark W. Croll

[57] ABSTRACT

An angled strips of brads with a plurality of cohered brads having a shank with a tip portion. A head portion of at least some of the plurality of brads having a bulge protruding forwardly from the leading side thereof and extending at least partially into the trailing side of the head portion of an adjacent brad. An upper leading side portion of the head portions of the plurality of brads offset rearwardly of the leading side of the shank, whereby interlocking of adjacent head portions of the angled strip of brads is reduced. The rearwardly biased head portion is formed preferably with a rearwardly sloped riser portion of a header punch.

22 Claims, 3 Drawing Sheets

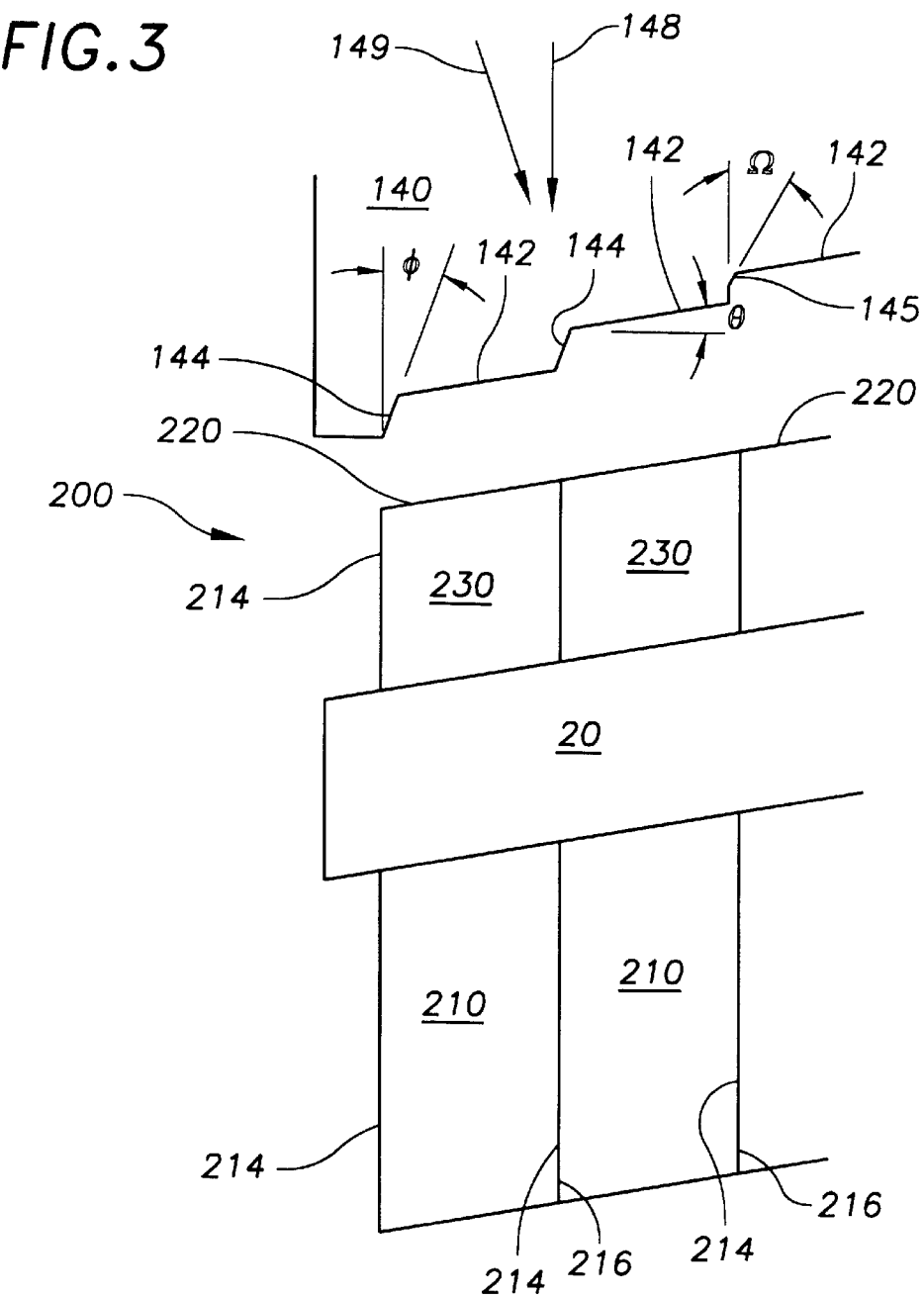
FIG. 3
FIG. 4
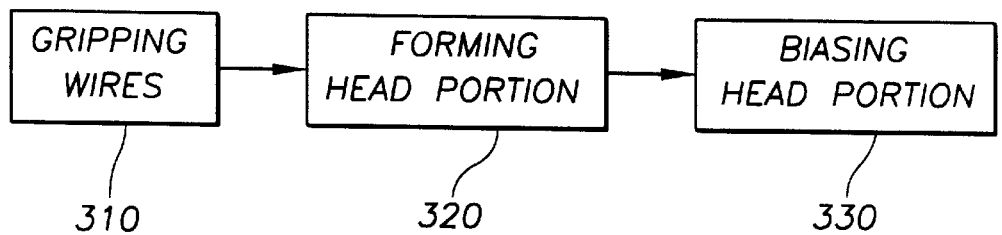

ANGLED STRIP OF BRADS AND METHOD THEREFOR

CROSS-REFERENCE TO RELATED APPLICATIONS

The present invention is related to copending U.S. application Ser. No. 08/883,087 filed on Jun. 26, 1997 entitled "Pneumatic Trim Nailer", and to copending U.S. application Ser. No. 08/882,768 filed on Jun. 26, 1997, entitled "Angled Chisel Point Brad And Method Therefor", both of which are assigned commonly and incorporated herein by reference.

BACKGROUND OF THE INVENTION

The invention relates generally to strips of brads useable in fastener driving tools, and more particularly to improvements in obliquely collated strips of brads, useable in power trim nailers, and methods for making the same.

The arrangement of brads in an obliquely collated strip, sometimes referred to as an angled strip of brads or merely as angled brads, for use in fastener driving tools having an aftwardly swept magazine is known generally. An exemplary fastener driving tool designed for angled brads is disclosed in the referenced co-pending U.S. Application entitled "Pneumatic Trim Nailer", assigned commonly and incorporated herein by reference.

A strip of angled brads comprises generally a plurality of brads, for example 50 or so brads, arranged adjacently and offset axially so that the angle of the collated strip corresponds generally to an angle between the magazine and a nose-piece channel of the tool. More specifically, the brads forming the collated strip are arranged so that an edge formed by adjacent head portions of the collated strip has substantially the same angular relationship to the longitudinal axis of the brads as the channel of the nose-piece has to the magazine. The plurality of brads are cohered by an adhesive material, like nitrocellulose, or alternatively by other frangible binding means, so that individual brads are separable from the collated strip during operation of the tool. An exemplary angled strip of brads is disclosed in the referenced co-pending U.S. Application entitled "Angled Chisel Point Brad And Method Therefor", also assigned commonly and incorporated herein by reference.

The collated strip of brads is disposed in the magazine of the tool and biased toward the nose-piece so that a leading endmost brad of the collated strip is disposed in the channel thereof. To install, or set, a brad, a gas or pneumatically powered driver blade is accelerated axially through the channel from behind the leading endmost brad and into engagement with a head portion thereof. The driver blade moves the leading endmost brad axially thus separating, or shearing, the brad from the collated strip. The remaining brads of the collated strip are retained in the tool magazine by a hardened shearing block, which engages an underside of the head portions thereof, as the driver blade shears the leading endmost brad therefrom. The sheared brad is then discharged from the nose-piece of the tool into a target material or workpiece.

The predominant force that must be overcome by the driver blade when shearing brads from the collated strip is that resulting generally from the adhesive or other binding means. Thus the pressure available to operate the driver blade is generally specified to provide an adequate but limited driving force for this purpose. The operating pressure is generally a characteristic of the tool, and depends on many variables including, among others, the particular type of tool, and whether the tool is hot or cold. The operating pressure may also vary among tools of the same manufacture and model. A known angled brad trim nailing tool, available from ITW Paslode, Vernon Hills, Ill., for example, operates in a pressure range between approximately 79 psi and approximately 102 psi. Other trim nailing tools operate at other pressures, which may be higher or lower.

Occasionally, the driver blade is unable to shear the leading endmost brad from the collated strip, resulting in misfiring of the tool. The inventors of the present invention have recognized that the occasional inability of the driver blade to shear brads from the collated strip results from a tendency for the head portion of adjacent brads to become interlocked during the manufacture thereof. Misfiring thus occurs when the driver blade is unable to overcome the adhesive or other forces binding the brads of the collated strip and any additional forces resulting from the interlocking of adjacent head portions. It is thus desirable to eliminate or at least substantially reduce the interlocking of adjacent brads, since the additional force required to shear interlocked brads from the collated strip sometimes prevents the shearing of the brads, and in any event detracts from the force available to drive the brads into the workpiece.

FIG. 5 illustrates one known prior art process for forming head portions on a plurality of wires 2 cohered in an angled strip 10. The strip of wires 10 is clamped between opposing portions of a gripper die 20 as a stepped header punch 30 applies one or more axial blows to end portions 14 of the wires 2 in a heading operation. The header punch 30 has a plurality of step and riser portions 32 and 34 that form head portions on corresponding wires 2 as the header punch 30 engages the strip 10. During the heading operation, the wire end portions 14 expand radially outwardly from the axis of the corresponding wire 2, as indicated by arrows 15. The radially expanding wire end portions 14 however tend to deform asymmetrically when struck by the header punch 30, and more particularly the radial expansion of the wire end portions 14 tends to be skewed toward the leading ends 3 of the wires 2. This tendency results from the strip of wires 10 having an angled edge 16 along the wire end portions 14 relative to the stepped portions 32 of the header punch 30.

The tendency for adjacent head portions to interlock during formation thereof is further complicated, or aggravated, by any misalignment between the steps of the header punch and the corresponding wires. This misalignment results generally from variation in wire diameter, and produces head portions that are misaligned, or out of registry, with the corresponding brad shanks. The interlocking of adjacent head portions tends also to be more severe in applications where the cohered strip of wires is pre-flattened, wherein the individual wires thereof have a generally elongated racetrack, rather than a round or circular, sectional shape. The racetrack sectional shape of pre-flattened, or merely flattened, wire is characterized generally by at least two opposing substantially parallel portions and two opposing curved portions. The substantially parallel portions may be straight and parallel or may have a generally arcuate shape.

The referenced co-pending U.S. Application entitled "Angled Chisel Point Brad And Method Therefor" discloses an alternative header die configuration having angled step portions for forming head portions 50 with a flatter top surface relative to the longitudinal axis of the brad shank. FIG. 5 of the present application illustrates the prior art header punch 30 having angled step portions 33, shown in phantom lines. This alternate header die configuration having angled step portions 33 alone, however, has no significant or appreciable effect toward lessening the interlocking of adjacent head portions.

FIG. 6 is a prior art angled strip of brads 40 having a plurality of brads 42 with corresponding leading and trailing ends 44 and 46 and a corresponding head portion 50. The adjacent head portions 50 are formed overlappingly, or interlockingly, in a manner that requires an increased driving force from the tool driver blade to shear individual brads from the cohered strip 40. Generally, the leading side 44 of the brad head portions 50 has a bulge extending interlockingly into the trailing side 46 of an adjacent brad head portion 50. The interlocking bulge results from the tendency of the head portion to form asymmetrically during the heading operation, as discussed above. The interlocking bulge of the head portions is a curved, generally S-shaped surface, which is approximated in FIG. 6 by first, second and third linear interface portions 52, 53 and 54 between adjacent head portions 50. The first and third interface portions 52 and 54 of the bulge have a generally positive upwardly extending slope, and the intermediate second interface portion 53 of the bulge has a generally negative downwardly extending slope.

In operation, the head portions 50 of all but the leading endmost brad 51 of the strip 40 are supported on a magazine shearing block 60, which prevents the brads in the cohered strip 40 from moving axially as the driver blade shears the leading endmost brad 51 therefrom. More particularly, an upper outermost corner 61 of the shearing block 60 digs into the underside of the brad adjacent the driver blade to prevent the remaining brads in the strip 40 from moving backwardly into the magazine, in a direction opposite the feed direction, during the shearing operation. Thus to shear the leading endmost brad from the strip, the driver blade must overcome the forces imposed by the interlocking adjacent head portions 50, and more particularly energy from the driver blade must be expended to deform the adjacent head portions to shear the endmost brad 51, since the strip cannot move backwardly to allow passage of the head of the endmost brad.

In collated strips of brads cohered by adhesives, the adhesive covers the brads from the head to tip portions thereof. Misfiring therefore tends to occur more frequently in longer brads cohered by adhesive, since a greater adhesive binding force must be overcome by the driver blade, and less interlocking is required to increase the binding force of adjacent brads beyond the shearing capacity of the driver blade. In the Paslode angled brad trim nailing tool operating in a pressure range between approximately 79 and 102 psi, misfiring begins to occur when installing adhesive coated brads having interlocking head portions with a length of two inches or more, and is particularly troublesome with interlocking brads with a length of two and one-half inches or more. In prior art angled brads having interlocking head portions, the bulge may extend forwardly of the leading side of the brad by as much as 0.011 inches or more.

The present invention is drawn toward advancements in the art of angled strips of brads useable in power trim nailing tools.

It is an object of the invention to provide novel angled strips of brads, useable in power trim nailing tools, and novel methods therefor that overcome problems in the art.

It is another object of the invention to provide novel angled strips of brads, and novel methods for the manufacture thereof, that are reliable and economical.

It is another object of the invention to provide novel angled strips of brads and novel methods for the manufacture thereof having improved performance, and more particularly angled strips of cohered brads from which individual brads are relatively reliably and consistently shearable in power trim nailing tools, and angled strips of brads that require relatively less force to shear brads from the cohered strip.

It is a further object of the invention to provide novel angled strips of brads, especially angled strips of brads cohered by adhesives, and novel methods for the manufacture thereof that have relatively reduced interlocking between adjacent brads, and that are less prone to misfire from power trim nailing tools.

It is another object of the invention to provide novel methods for manufacturing novel angled strips of brads having relatively reduced interlocking between adjacent head portions thereof by biasing a leading side of the head portions of the brads rearwardly toward trailing sides of the brads during a head forming, or heading, operation.

It is yet another object of the invention to provide novel methods for manufacturing novel angled strips of brads having relatively reduced interlocking between adjacent head portions thereof by forming head portions with a relatively reduced bulge protruding forwardly from a leading side of the brad.

It is a more particular object of the invention to provide a novel angled strips of brads comprising generally a plurality of brads having a shank with a tip portion. A head portion of at least some of the plurality of brads having a bulge protruding forwardly from the leading side thereof and extending at least partially into the trailing side of the head portion of an adjacent brad. An upper leading side portion of the head portions of the plurality of brads offset rearwardly of the leading side of the shank, whereby interlocking of adjacent head portions of the angled strip of brads is reduced.

It is another more particular object of the invention to provide novel methods for manufacturing novel angled strips of brads formed by biasing a leading side of the head portions of the plurality of flattened wires rearwardly toward a trailing side of the plurality of flattened wires with a riser portion of a header punch, and preferably with a rearwardly sloped riser portion of a header punch.

These and other objects, aspects, features and advantages of the present invention will become more fully apparent upon careful consideration of the following Detailed Description of the Invention and the accompanying Drawings, which may be disproportionate for ease of understanding, wherein like structure and steps are referenced generally by corresponding numerals and indicators.

BRIEF DESCRIPTION OF THE DRAWINGS

FIG. 3 is an exemplary header punch for forming head portions on a strip of wires according to the present invention.

FIG. 4 is a process flow diagram for practicing the present invention.

DETAILED DESCRIPTION OF THE INVENTION

Figure 1:
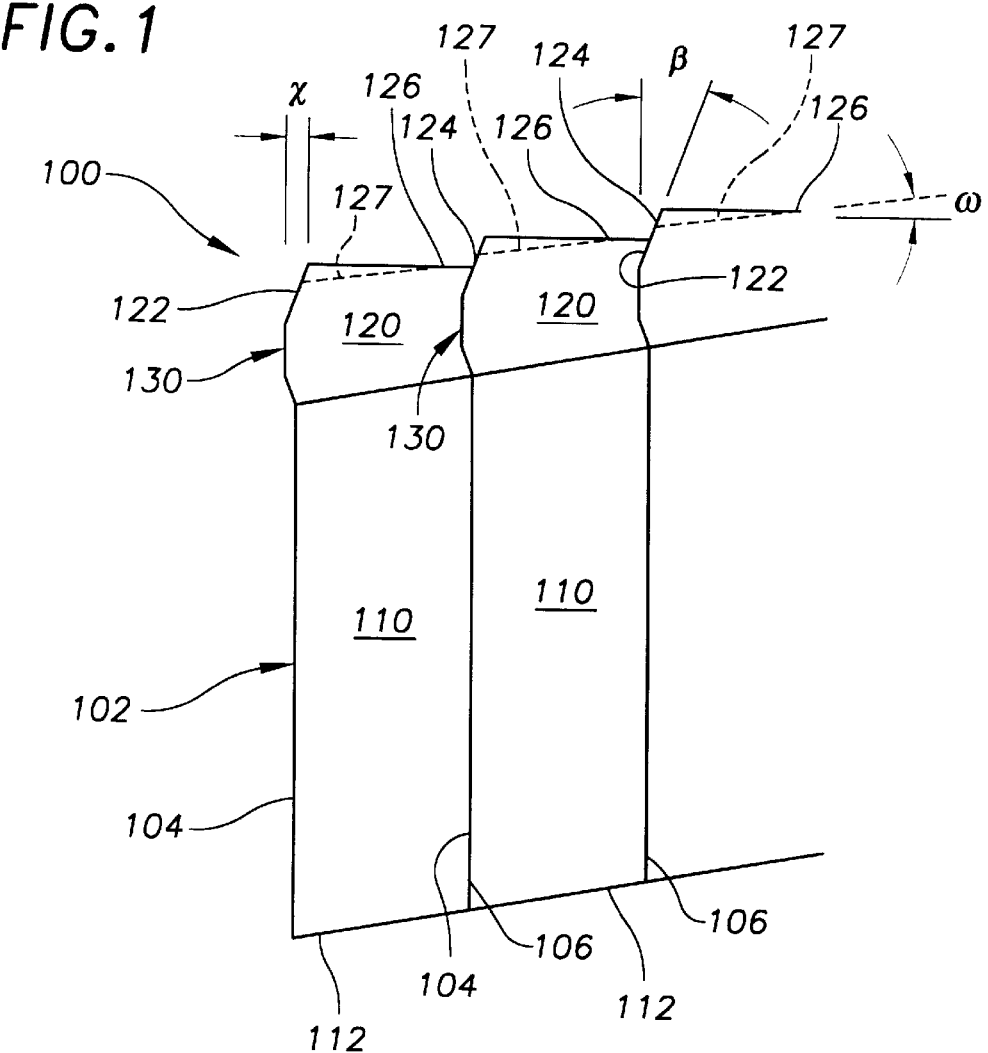
FIG. 1 is an angled strip of brads according to an exemplary embodiment of the invention.

FIG. 1 is an angled strip of brads 100 formed from a plurality of flattened wires, useable in power trim nailing tools having an angled magazine for accommodating the angled strip of brads, and a driver blade for shearing individual brads from the angled strip of brads and driving the individual brads into a workpiece. One exemplary tool suitable for this purpose is the angled trim nailing tool, available from ITW Paslode, Vernon Hills, Ill., which operates in a pressure range between approximately 79 psi and approximately 102 psi, and is capable of driving brads having an axial length of as long as two and one-half inches. The angled strips of brads of the present invention may also be used advantageously in many other power trim nailing tools, which may operate at higher or lower pressures.

The angled strip of brads 100 of the present invention comprises generally a plurality of brads 102 each having a shank 110 with a tip portion 112 and a head portion 120. The plurality of brads 102 each have generally a leading side 104 and a trailing side 106 arranged adjacently, offset axially, and cohered side by side to form the angled strip of brads 100. The plurality of brads are cohered preferably by an adhesive material like nitrocellulose, or alternatively by other frangible binding means that permit individual brads to be sheared from the collated strip during operation of the tool as is known generally in the art.

Figure 2:
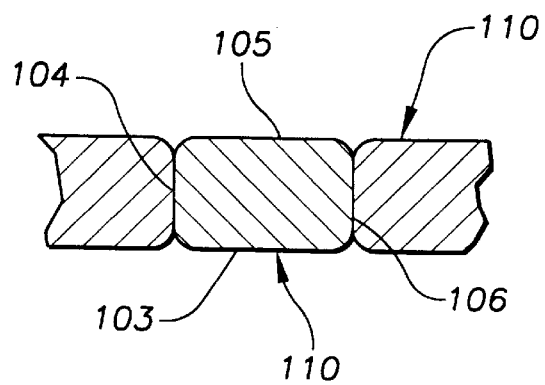
FIG. 2 is a partial sectional view of an angled strip of brads.
Figure 5:
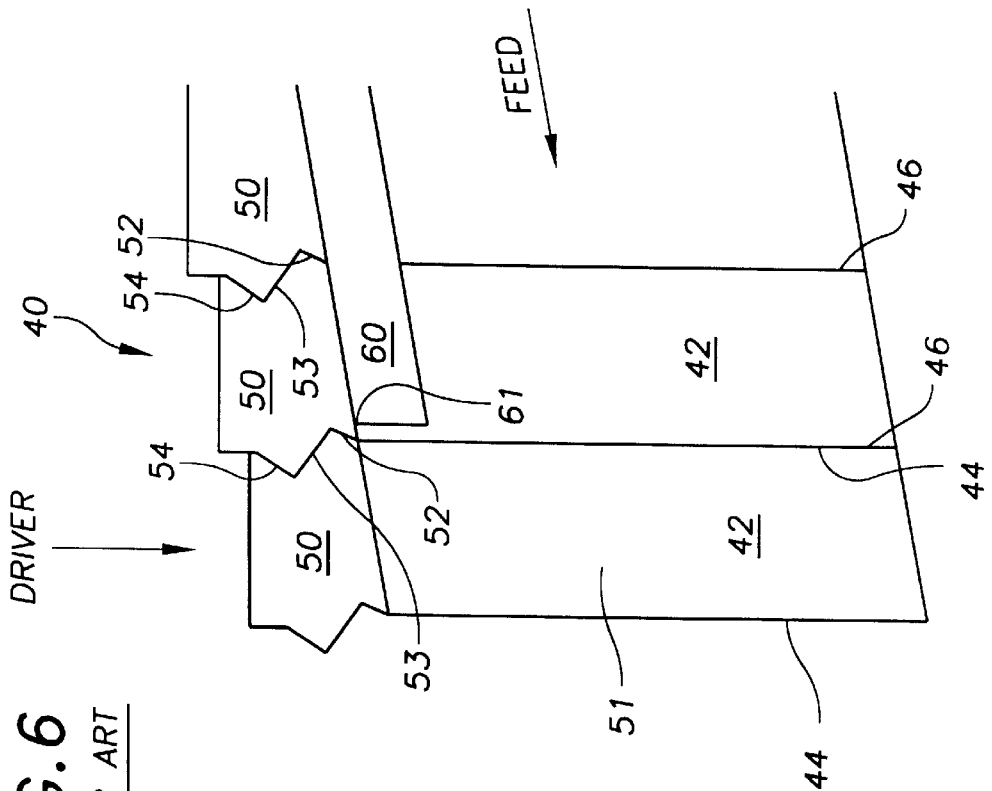
FIG. 5 is a prior art header punch for manufacturing prior art angled strips of brads.
Figure 6:
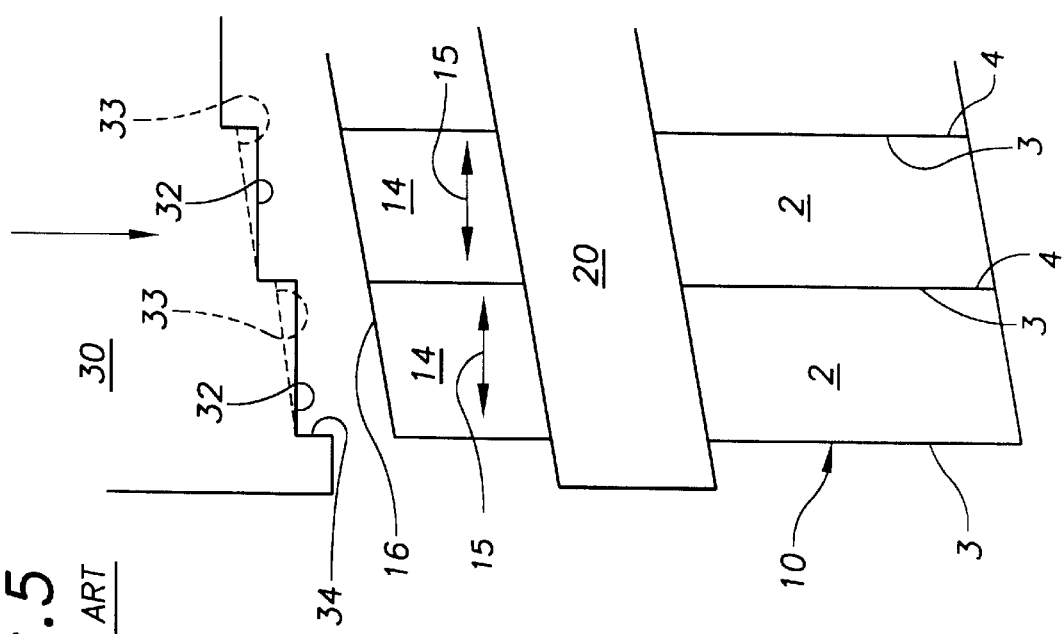
FIG. 6 is a prior art angled strip of brads.

FIG. 2 illustrates the plurality of brads and more particularly the shank 110 thereof having preferably an elongated racetrack cross-sectional shape, which is produced by forming the angled brads from a partially flattened strip of wires, as discussed further below. The racetrack sectional shape of the flattened, or pre-flattened, wires is characterized generally by at least two opposing, generally parallel portions 103 and 105 and two opposing generally curved portions corresponding to the leading and trailing side portions 104 and 106. The opposing substantially parallel portions 103 and 105 may be straight and parallel, as illustrated in FIG. 2, or may have a generally arcuate shape. And in other embodiments the shank 110 may have a round or oval or generally rectangular or other sectional shape.

In one preferred embodiment, the plurality of brads have an axial length of at least 2 inches, and in another preferred embodiment the plurality of brads have an axial length of at least two and one-half inches. This exemplary range of brad axial lengths is not intended to be limiting however, and in other embodiments the axial length may be less than two inches and greater than two and one-half inches.

The head portions 120 of at least some of the plurality of brads 102 have a bulge 130 having a generally curved surface protruding generally forwardly from the leading side 104 thereof, and extending at least partially into the trailing side 106 of the head portion 120 of an adjacent brad. FIG. 1 illustrates more particularly the bulge 130 protruding forwardly of the leading side 104 of the brad a distance χ which is preferably not more than approximately 0.005 inches. The extent to which the bulges 130 of the brads 102 of the present invention protrude forwardly however is advantageously reduced in comparison to prior art angled strips of brads. Reducing the bulge 130 in the brads of the present invention, and thus the extension thereof into the trailing side 106 of an adjacent head portion, reduces the extent to which adjacent head portions 120 interlock so that individual brads are shearable from the strip of brads with a relatively reduced force. This eliminates or at least substantially reduces the tendency of trim nailing tools to misfire, particularly when setting longer adhesive cohered brads, and thus provides greater brad setting reliability, which is a remarkable improvement over prior art angled strips of brads.

FIG. 1 illustrates the head portions 50 of the plurality of brads 102 having generally an upper leading side portion 122 offset rearwardly of the leading side 104 of the shank 110. The upper leading side portion 122 of the head portion 120 slopes generally rearwardly toward the trailing side 106 of the brad at an angle β between approximately 2 degrees and approximately 5 degrees, and in a presently preferred embodiment, the angle β is approximately 2.5 degrees. The upper leading side portion 122 includes preferably at least an upper leading side portion 124 not contacting an adjacent head portion. Offsetting the upper leading side portion 122 of the head portion rearwardly of the leading side 104 of the brad has the effect of reducing the extent to which the bulge 130 protrudes interlockingly into the trailing side 106 of the adjacent head portion, as discussed more fully below.

FIG. 1 also illustrates the head portions of the plurality of brads having an axial end 126 generally perpendicular to an axis of the shank. In one embodiment, the axial ends 126 are perpendicular to the axis of the shank, and in another embodiment the axial ends 126 are sloping increasingly from the leading side 104 to the trailing side 106 of the brads, as illustrated by phantom lines 127 and discussed below. The axial ends 126 of the head portions 120 slope generally at an angle ω between approximately 1 degree and approximately 7 degrees, and in a presently preferred embodiment, the angle ω is approximately 2 degrees. Sloping the axial end portion of the head portion also has the effect of reducing the extent to which the bulge 130 protrudes interlockingly into the trailing side 106 of the adjacent head portion when employed in combination with the sloped side portion 122.

FIG. 3 illustrates a stepped header punch 140 for forming angled strips of brads according to the present invention, and more particularly for forming head portions on a plurality of individual flattened wires 210 arranged in a strip 200 with at least one axial end 220 angled relative to an axis of the flattened wires. The method comprises generally gripping the strip of wires 200, as illustrated in block 310 of the process flow diagram of FIG. 4, for example by clamping between opposing portions of a gripper die 20 or gripping by other means that prevent axial movement of the plurality of wires 210 during the head forming operation illustrated in block 320 of the process flow diagram of FIG. 4 and discussed further below.

The head portions 120 of the brads 102, illustrated in FIG. 1, are formed on the plurality of flattened wires 210, in the heading operation, by punching the individual end portions 220 of the wires 210 with a corresponding stepped portion of the header punch 140 as the header punch 140 is driven generally axially toward the angled axial ends 220 thereof. The stepped header punch 140 includes multiple stepped portions 142 arranged generally perpendicular to the axis of the corresponding flattened wires 220, and multiple corresponding riser portions 144 arranged generally parallel to a leading side portion 214 of the corresponding flattened wires 210.

A leading side 214 of the head portions, and more particularly the leading side 214 of an upper portion 230 of the flattened wires 210 is biased rearwardly toward a trailing side 216 thereof with the corresponding riser portion 144 of the header punch 140 during the head forming operation, as illustrated in block 330 of the process flow diagram of FIG. 4, whereby interlocking of adjacent head portions of the angled strip of brads is reduced as discussed above and illustrated in FIG. 1.

In one configuration, the riser portions 144 of the header punch 140 are sloped rearwardly from a leading side 214 of the corresponding flattened wire to a trailing side 216 thereof. FIG. 3 illustrates one configuration wherein the entire riser portion 144 slopes rearwardly at an angle φ between approximately 2 degrees and approximately 5 degrees, and in a presently preferred embodiment, the angle φ is approximately 2.5 degrees. In an alternative header punch configuration, only an to upper portion 145 of the riser portion 144 is sloped at an angle Ω between approximately 30 degrees and approximately 60 degrees, and in a presently preferred embodiment, the angle Ω is approximately 45 degrees.

In one method of forming the head portions on the flattened wires 210, the header punch 140, having sloped riser portions 144, is driven along a drive path 148, which is parallel to the axis of the plurality of flattened wires, toward the angled axial ends 220 thereof. As the stepped header punch 140 engages the axial ends 220 of the wires 210 and begins to form the head portions, the leading side 214 of the head portions, including at least the upper leading side portion not contacting an adjacent head portion after formation of the head portions, are biased rearwardly toward a trailing side 216 thereof by the rearwardly sloped riser portions 144, thereby forming the angled strips of brads shown in FIG. 1 and discussed above.

In an alternative method of forming the head portions on the flattened wires 210, the header punch 140 is driven along a drive path 149, which is at an angle relative to the axis of the plurality of flattened wires, toward the angled axial ends 220 thereof. An equivalent mode of operation is to orient and clamp the strip of flattened wires 200 at an angle relative to the header punch 140, for example by rotating the angled strip of brads 200 clockwise relative to the path 148 of the header punch. According to either of these alternative modes of operation, the header punch 140 is driven along a path extending effectively from the leading side 214 of the flattened wires 210 toward a trailing side 216 thereof. As the stepped header punch 140 engages the axial ends 220 of the wires 210 and begins to form the head portions, the leading side 214 of the head portions of the plurality of flattened wires 210 are biased rearwardly toward a trailing side 216 thereof by the riser portions 144, thereby forming the angled strips of brads shown in FIG. 1. The angle of the rearwardly sloped riser portions 144 may be reduced, or eliminated entirely so that the angle φ or Ω is zero, when forming the head portions by driving the header punch 140 at an angle.

In another configuration, the stepped portions 142 of the header punch 140 are sloped upwardly from a leading side 214 of the corresponding flattened wire toward a trailing side 216 thereof. FIG. 3 illustrates one configuration wherein the stepped portion 142 slopes upwardly at an angle θ between approximately 1 degree and approximately 7 degrees, and in a presently preferred embodiment, the angle θ is approximately 2 degrees.

In head forming operations with a header punch having upwardly sloped stepped portions 142, the upwardly sloped stepped portions 142 increase the effectiveness with which the rearwardly sloped riser portions 144 bias the leading sides 214 of the head portions of the plurality of flattened wires rearwardly toward a trailing side of the plurality of flattened wires. More particularly, in operations where the header punch 140 moves axially along the path 148, the upwardly sloped stepped portions bias the leading sides 214 of the wires 210 rearwardly in concert with rearwardly sloped riser portions 144. The upwardly sloped stepped portions 142 of the header punch 140 produces correspondingly sloped axial end portions 127 on the brads, illustrated in phantom lines in FIG. 1, without adversely affecting performance of the brads.

In operations where the header punch 140 moves along the angled path 149, or its equivalent, the angle of the sloped stepped portions 142 is preferably at least sufficient to compensate for the angular path 149 at which the header punch 140 travels so that the axial ends 126 formed on the head portions, shown in FIG. 1, are oriented transversely to the axis of the brads. Further sloping of the stepped portions 142 will further bias the leading sides 214 of the wires 210 rearwardly in concert with riser portions 144, which engage the upper leading sides 214 at an angle by virtue of the angled path 149 of the header punch or the angular orientation of the strip of flattened wires 200 relative to the path 148, as discussed above.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. An angled strip of brads formed simultaneously from a plurality of adjacently arranged parallel wires, useable in a trim nailing tool having an angled magazine for accommodating the angled strip of brads and a driver blade for shearing individual brads from the angled strip of brads, comprising:

a plurality of brads having a shank with a tip portion and a head portion, the plurality of brads each having a leading side and a trailing side, the plurality of brads arranged adjacently, offset axially, and cohered side by side to form the angled strip of brads, the head portion of at least some of the plurality of brads having a bulge protruding forwardly from the leading side thereof not more than approximately 0.005 inches, and extending at least partially into the trailing side of the head portion of an adjacent brad.

2. The angled strip of brads of claim 1 further comprising the shank of the plurality of brads having a racetrack cross-section.

3. The angled strip of brads of claim 1 further comprising the plurality of brads cohered by an adhesive material.

4. The angled strip of brads of claim 1 further comprising the bulge of the brads having a generally curved surface.

5. The angled strip of brads of claim 1 further comprising the plurality of brads having an axial length of at least 2 inches.

6. The angled strip of brads of claim 1 further comprising an upper leading side portion of the head portions of the plurality of brads offset rearwardly of the leading side of the shank.

7. The angled strip of brads of claim 1 further comprising the head portions of the plurality of brads having an axial end generally perpendicular to an axis of the shank, the axial ends sloping increasingly from the leading side to the trailing side.

8. The angled strip of brads of claim 1 further comprising the plurality of brads having an axial length of at least 2 inches.

9. The angled strip of brads of claim 1, the bulge on the leading side of the head portion of some of the brads interlocking with the trailing side of the head portion of an adjacent brad.

10. An angled strip of brads formed simultaneously from a plurality of adjacently arranged parallel wires, useable in a trim nailing tool, comprising:

a plurality of brads having a shank with a tip portion and a head portion, the plurality of brads each having a leading side and a trailing side, the plurality of brads arranged adjacently, offset axially, and cohered side by side to form the angled strip of brads, the head portion of at least some of the plurality of brads having a bulge protruding forwardly from the leading side thereof, the bulge of some of the plurality of brads extending at least partially into the trailing side of the head portion of an adjacent brad, an upper leading side portion of the head portions of the plurality of brads offset rearwardly of the leading side of the corresponding shank.

11. The angled strip of brads of claim 10 further comprising the head portions of the plurality of brads having an axial end generally perpendicular to an axis of the shank, the axial ends sloping increasingly from the leading side to the trailing side.

12. The angled strip of brads of claim 10 further comprising shank of the plurality of brads having a racetrack cross-section.

13. The angled strip of brads of claim 10 further comprising the plurality of brads cohered by an adhesive material.

14. The angled strip of brads of claim 10 further comprising the bulge of the brads having a generally curved surface.

15. The angled strip of brads of claim 10 further comprising the upper leading side portion of the head portions of the plurality of brads offset rearwardly of the leading side of the shank includes an upper leading side portion not contacting an adjacent head portion.

16. The angled strip of brads of claim 8, the bulge on the leading side of the head portion of some of the brads interlocking with the trailing side of the head portion of an adjacent brad.

17. A method of forming an angled strip of brads, useable in a trim nailing tool, comprising:

gripping a plurality of wires arranged in a strip having at least one angled axial end;

punching end portions of the plurality of wires with a stepped header punch driven toward the angled axial end of the strip;

forming a head portion on each of the plurality of wires with a corresponding stepped portion of the header punch and a corresponding riser portion of the header punch, the stepped portions of the header punch generally perpendicular to an axis of the corresponding wire, and the riser portions of the header punch sloped rearwardly from a leading side of the corresponding wire to a trailing side thereof;

biasing a leading side of the head portions of the plurality of wires rearwardly toward a trailing side of the plurality of wires with the rearwardly sloped riser portion of the header punch when forming the head portions, whereby interlocking of adjacent head portions of the angled strip of brads is reduced.

18. The method of claim 17 further comprising biasing the leading side of the head portions of the plurality of wires rearwardly toward a trailing side of the plurality of wires with the stepped portion of the header punch.

19. The method of claim 17 further comprising biasing the leading side of the head portions of the plurality of wires rearwardly toward a trailing side of the plurality of wires with an upwardly sloped stepped portion of the header punch.

20. The method of claim 17 further comprising driving the header punch along the axis of the plurality of wires toward the angled axial end of the strip.

21. A method of forming an angled strip of brads, usable in a trim nailing tool, comprising:

gripping a plurality of wires arranged in a strip having at least one angled axial end;

punching end portions of the plurality of wires with a stepped header punch driven toward the angled axial end of the strip;

forming a head portion on each of the plurality of wires with a corresponding stepped portion of the header punch and a corresponding riser portion of the header punch, the stepped portions of the header punch generally perpendicular to to an axis of the corresponding wire, and the riser portions of the header punch generally parallel to a leading side of the corresponding wire;

biasing a leading side of the head portions of the plurality of wires rearwardly toward a trailing side of the plurality of wires by driving the header punch along a path at an angle relative to the axis of the plurality of wires when forming the head portions, whereby interlocking of adjacent head portions of the angled strip of brads is reduced.

22. The method of claim 21 further comprising driving the header punch along a path extending from the leading side of the wires toward a trailing side of the wires.

* * * * *